No. 636,280. Patented Nov. 7, 1899.
J. N. NUTT.
HOPPER FOR FEEDING GRAIN, &c.
(Application filed Oct. 15, 1898.)
(No Model.)
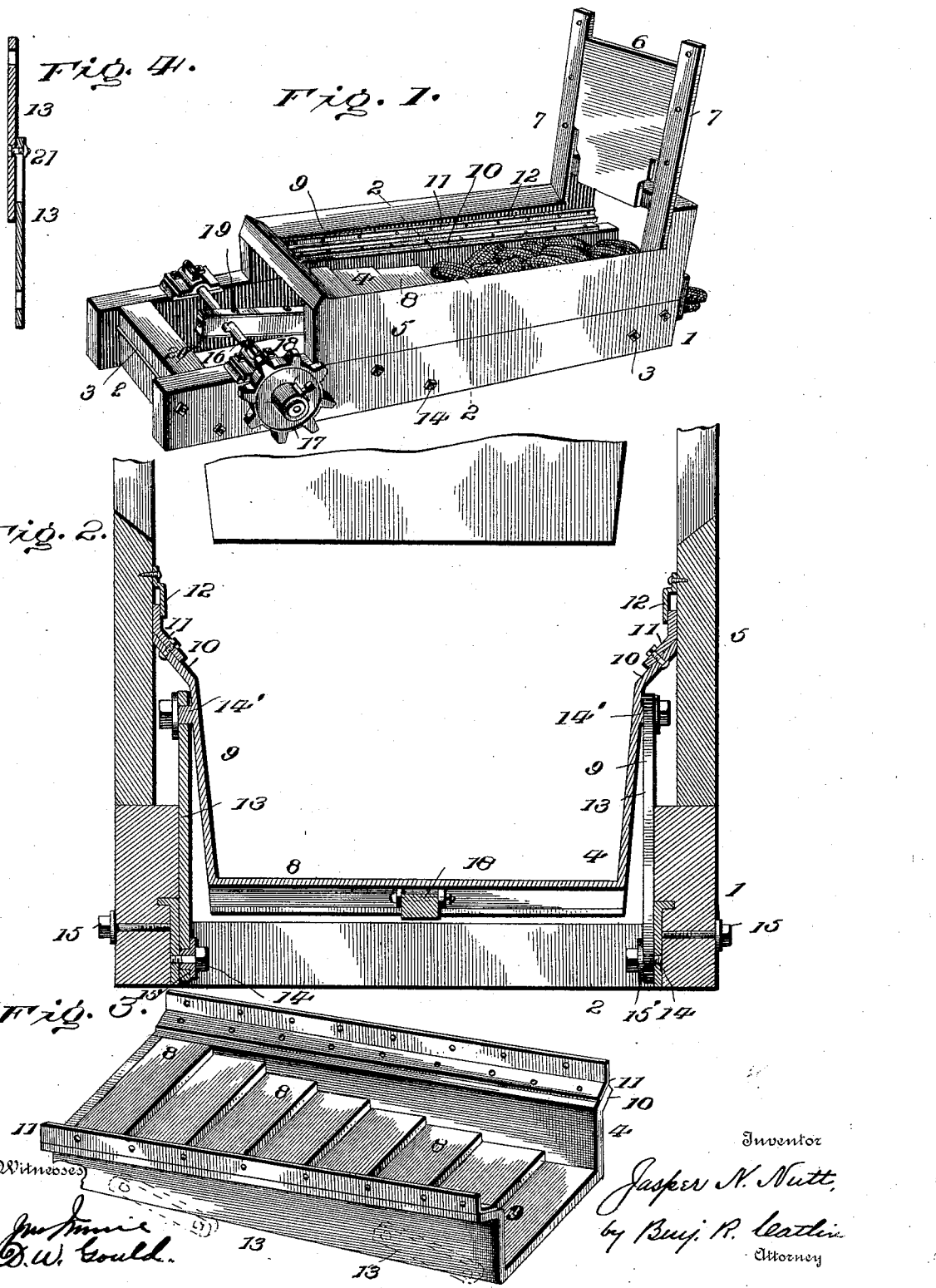
Inventor
Jasper N. Nutt,
by Benj. R. Catlin
Attorney
Witnesses

UNITED STATES PATENT OFFICE.

JASPER N. NUTT, OF SIDNEY, OHIO.

HOPPER FOR FEEDING GRAIN, &c.

SPECIFICATION forming part of Letters Patent No. 636,280, dated November 7, 1899.

Application filed October 15, 1898. Serial No. 693,634. (No model.)

*To all whom it may concern:*

Be it known that I, JASPER N. NUTT, a resident of Sidney, in the county of Shelby and State of Ohio, have invented certain new and useful Improvements in Hoppers for Feeding Grain and other Material; and I do hereby declare the following to be a full, clear, and exact description of the invention, such as will enable others skilled in the art to which it pertains to make and use the same.

The invention relates to feeding-hopper mechanism suitable for grain and other material and applicable to feeding corn on the ear to a corn-sheller. Its object is to increase the efficiency, certainty, and regularity of action of such devices and provide for durability and economy of construction.

The invention consists in the construction herein described and pointed out.

In the accompanying drawings, Figure 1 is a perspective of the improved grain-feeder. Fig. 2 is a section on line 2 2 of Fig. 1. Fig. 3 is a perspective of a movable hopper. Fig. 4 is an elevation of a detail.

Numeral 1 denotes a frame with a base and upper section conveniently made of wood and comprising sills or base side pieces connected by cross-pieces 2 and bolts 3. This frame in case of a feeder to a corn-sheller may conveniently have a length of five feet, a width of twenty-one or twenty-two inches, and a height of thirteen inches. The rails toward the delivery end of the hopper are preferably placed flatwise or are inclined widthwise to permit the inclined reciprocating hopper 4 to be situated between the sills, it being desirable to avoid unnecessary height of the frame and hopper.

5 denotes the upper frame-section, which constitutes a fixed hopper and incloses the upper part of the reciprocating hopper 4 and is provided with a feed-board 6, sliding in ways in posts 7.

The hopper 4, which may be made of cast metal or any suitable material, has in its bottom a series of steps 8, in each of which the tread portion is preferably made wider than the riser and slightly inclined upward toward its receiving end, whereby the bottom of the hopper as a whole is made with an incline. An angle of about ten degrees has been found suitable. The sides 9 of the hopper flare outwardly and have portions 10 flared at an angle of about forty-five degrees, and these are provided with flanges 11, shaped to be parallel with the sides of the upper frame-section, as indicated. The flanges 11 can be made separate of thin metal or other material and secured to the hopper, though it is not essential that they be of separate pieces. The flanges 11 are covered by suitable bent strips or guards 12 to prevent finer grain or other material falling over the sides of the reciprocating hopper 4.

Both the upper edges 11 of the hopper and guard 12 are vertically disposed, and a space is left between them in a vertical plane to permit a slight play of the hopper. The guards 12 are detachably secured to the hopper to provide for changes in the length of the hopper-supporting posts to be described.

13 denotes four posts adapted to be oscillated about supporting studs or screws 14, each fixed in the frame-sills and provided with a suitable cap-nut or washer and nut and combined with a collar 15'.

The hopper near its upper portion is provided with studs 14', whereby it is suspended between the posts arranged in pairs toward each end. The studs 14 may conveniently be formed with bases and secured to the sills by screw-bolts 15. The studs 14' can be cast integrally with the hopper; but in this and other details of form, dimensions, and material all known equivalents are contemplated. The hopper hung on the oscillating posts is reciprocated by means of a crank-shaft 16, having bearings on or in the sills and provided with a wheel 17 to coöperate with a driving chain or belt.

18 denotes a rod or bar pivotally connecting the under side of the reciprocating hopper with the crank-shaft. This bar may be made of wood and straps 19 employed to connect it to the bearing-blocks 20.

In operation corn or other material having been charged into the hopper the shaft 16 is driven, with the effect to reciprocate the movable hopper, which by its gentle inclination and pushing-shoulders 8 feeds forward the material with uniformity and certainty and without any danger of an accidental discharge of the whole or of any considerable part of the charge by the slipping of material, as is liable to happen in inclined hoppers otherwise constructed. The rate of feeding can be regulated by changing the speed of the crank-shaft or by adjusting the inclination of the feeding-hopper or by both means.

In Fig. 4 are shown at 21 devices for varying the length of the oscillating hopper-supporting posts, whereby the inclination of the hopper can be varied as required by different kinds and conditions of material.

It will be noted that the lengthwise inclination of the movable hopper can be made very small and that its elevation above the bottom of the base-frame is small, whereby the height of the whole can be diminished, which is one of the objects of the improvement.

The sills of the base are adapted to rest directly on a floor or on the ground, and the side members of the hopper-frame rest lengthwise directly upon said sills. By this construction and also by the flatwise disposition of a part of the cross-bars of the base the whole structure is made of small height to avoid the necessity of lifting the corn or other material as high as heretofore necessary. The stepped construction in the hopper-bottom also contributes to the same end, since a smaller inclination of said bottom is required. The stepped hopper-bottom has heretofore been used, but not in the relations herein claimed. The extension of the sills lengthwise beyond the hopper-frame provides that the crank-shaft journal-boxes may be placed immediately on the free edges of said sills and that the hopper-moving mechanism may thus be made easy of access and inspection. The construction is one of great simplicity and economy and effects the desired results above described.

Having thus described my invention, what I claim as new, and desire to secure by Letters Patent, is—

1. In a grain-feeder, the horizontal sills, the superposed frame extending only part of the length of the sills, stepped feeder having flaring sides, a removable flange and overlying guard for said flaring sides, upright posts at end of frame, feed-regulating slide carried by the posts, and means for reciprocating the hopper.

2. In a grain-feeder, the horizontal sills, the superposed frame extending only part of the length of the sills, stepped feeder having flaring sides, a removable flange and overlying guard for said flaring sides, upright posts at end of frame, feed-regulating slide carried by the posts, means for reciprocating the hopper, and supports 13 pivoted at bottom to sills and at top to hopper.

In testimony whereof I have signed this specification in the presence of two subscribing witnesses.

JASPER N. NUTT.

Witnesses:
  J. E. RUSSELL,
  W. W. ROBINSON.